United States Patent [19]
Song

[11] Patent Number: 6,062,085
[45] Date of Patent: May 16, 2000

[54] INTERPENETRATION APPARATUS FOR MEAUSUREMENT OF UNDERGROUND BLASTING VIBRATION

[75] Inventor: Myung Jun Song, Seoul, Rep. of Korea

[73] Assignee: Hyundai Engineering & Construction Co., Ltd., Kyungki-do, Rep. of Korea

[21] Appl. No.: 09/008,318

[22] Filed: Jan. 20, 1998

[30] Foreign Application Priority Data

May 13, 1997 [KR] Rep. of Korea ....................... 97-18468

[51] Int. Cl.⁷ ........................... G01H 11/00; G01D 21/00
[52] U.S. Cl. ........................... 73/649; 73/866.5; 367/188; 181/122
[58] Field of Search ............................. 73/649, 658, 661, 73/651, 866.5; 367/145, 159, 188, 178, 180, 189; 181/108, 112, 116, 122

[56] References Cited

U.S. PATENT DOCUMENTS

| 4,686,653 | 8/1987 | Staron et al. | 367/25 |
| 4,850,449 | 7/1989 | Cheung | 181/101 |
| 4,884,250 | 11/1989 | Kitzinger et al. | 367/180 |

*Primary Examiner*—Hezron Williams
*Assistant Examiner*—Helen C. Kwok
*Attorney, Agent, or Firm*—Kile, McIntyre, Harbin & Lee; Eugene M. Lee

[57] ABSTRACT

An interpenetration apparatus for the measurement of a magnitude of a blasting vibration comprises a housing including a fixture and a mover divided into two, symmetrically, in a longitudinal direction, in which the fixture includes a space for receiving a cable and the mover includes at least two grooves perforated to receive sensors, respectively; a head portion for fixing the front end of coupled fixture and mover to prevent the escape of the mover from the fixture; a handle including a fixing rod threadedly coupled to the rear portion of the fixture; a connecting rod connected to the fixing rod and extended in a predetermined length therefrom to insert the interpenetration apparatus into a working hole perforated adjacent to an approach to a tunnel; and a traction tool connected to the rear end of the mover to operate the mover, thereby enabling the housing to be at the nearest position from the blasting place, and sensitively detecting the wave motion of the blasting vibration as well as three dimensional blasting vibration transferred in all directions to the underground by the sensors to establish the accuracy measurement of the magnitudes of the blasting vibrations.

8 Claims, 5 Drawing Sheets

INTERPENETRATION APPARATUS FOR MEAUSUREMENT OF UNDERGROUND BLASTING VIBRATION

The invention is related to providing a technology for measuring vibrations occurred upon the blasting of an underground tunnel construction, and particularly, to providing an interpenetration apparatus for the measurement of the underground blasting vibration, for sensing an magnitude of vibrations at the position nearest to a blasting place upon the blasting and measuring the magnitude of the blasting vibration in a higher accuracy.

PRIOR ART

A conventional excavating method has been selectively performed by using an explosive charge in excavating a rock bed, effectively, during the constructing of a vertical or horizontal tunnel. It has required the measurement of a magnitude of blasting vibration transferred from the blasting place to the underground for determining the blasting method and position after recognizing the effects such as the disturbance of the surrounding underground.

On the other hand, a conventional method comprises steps of mounting a sensor on the side wall of a tunnel to be excavated and measuring a magnitude of blasting vibrations in the underground based on the signal from the sensor. Herein, it is noted that the conventional method fails to teach means or a method for mounting the sensor adjacent to the blasting place. It has a problem in that an amount and magnitude of the blasting vibration can not be exactly measured.

Firstly, even through the sensor is mounted on the side wall of an approach to a tunnel by means of a tape or by using adhesive agents, but the sensor was used to be easily escaped from its mounting position due to the blasting vibration. It results in making impossible to perform the measuring work of the underground blasting vibration.

Secondly, it was not possible for the sensor to detect an exact magnitude of the blasting vibration transferred to the underground from the blasting place, because it might be mounted at the position far away from the blasting place in order to prevent the escape that may occur upon the blasting.

Thirdly, it was anxious that the sensor is exposed directly to the blasting vibration and impact and may be broken down.

In order to overcome these problems, it has been limitedly practiced in some working places that the sensor is mounted into a flexible tube and the flexible tube is inserted into a hole perforated on the side wall of the tunnel approach in order to detect a magnitude of the blasting vibration. It is intended to exactly sense the magnitude of the blasting vibration, but the flexible tube itself functions to absorb the blasting vibration. It results in that the sensor could not react to the blasting vibration in a good sensitivity, thereby deteriorating the precision on the measurement of the blasting vibration.

Accordingly, an object of the invention is to provide an interpenetration apparatus for the measurement of a magnitude of a blasting vibration for enabling a sensor to be interpenetrated thereunto to detect the blasting vibration transferred in radial directions closest to a blasting place, thereby enhancing the precision and reliability on the measurement of the blasting vibration.

Another object of the invention is to provide an interpenetration apparatus for the measurement of a magnitude of a blasting vibration for facilitating a sensor to be mounted therein or separated therefrom, thereby improving the working environment on the underground blasting vibration measurement.

Another object of the invention is to provide an interpenetration apparatus for the measurement of a magnitude of a blasting vibration for protecting a sensor from the blasting vibration and impact and prolonging its life.

SUMMARY OF THE INVENTION

According to the invention, an interpenetration apparatus for the measurement of a magnitude of a blasting vibration comprises a housing including a fixture and a mover divided into two, symmetrically, in a longitudinal direction, in which the fixture includes a space for receiving a cable and the mover includes at least three grooves perforated to receive sensors, respectively; a head portion for coupling the front ends of a fixture and a mover to prevent the escape of the mover from the fixture; a handle including a fixing rod threadedly coupled to the rear portion of the fixture; a connecting rod connected to the fixing rod and extended in a predetermined length therefrom to insert the interpenetration apparatus into a working hole perforated adjacent to an approach to a tunnel; and a traction means connected to the rear end of the mover to operate the mover.

According to the interpenetration apparatus, the housing includes the fixture and the mover divided into two, symmetrically, in a manner that if one end of the fixture has an area smaller than that of the mover on the same surface, other end of the fixture has larger area than that of the mover on the same surface. The housing receives sensors in its mover and is inserted into the working hole perforated adjacent to the blasting place to enable the sensor to access to the blasting position nearest thereto. Therefore, the sensor can detect an exact magnitude of the blasting vibration. At that time, the handle facilitates the housing to be inserted and mounted in the working hole with a traction means. Then, the traction means is pulled outside to slidably move the mover along a slant guide groove on the fixture positioned by the handle until clogging the working hole. It means that two lager diameter portions of the handle and the traction means are tightly secured to the inner surrounding wall portion of the working hole.

BRIEF DESCRIPTION OF DRAWINGS

The invention now will be described in detail with reference to the accompanying drawings, in which.

DETAILED DESCRIPTION OF INVENTION

Figure 1:
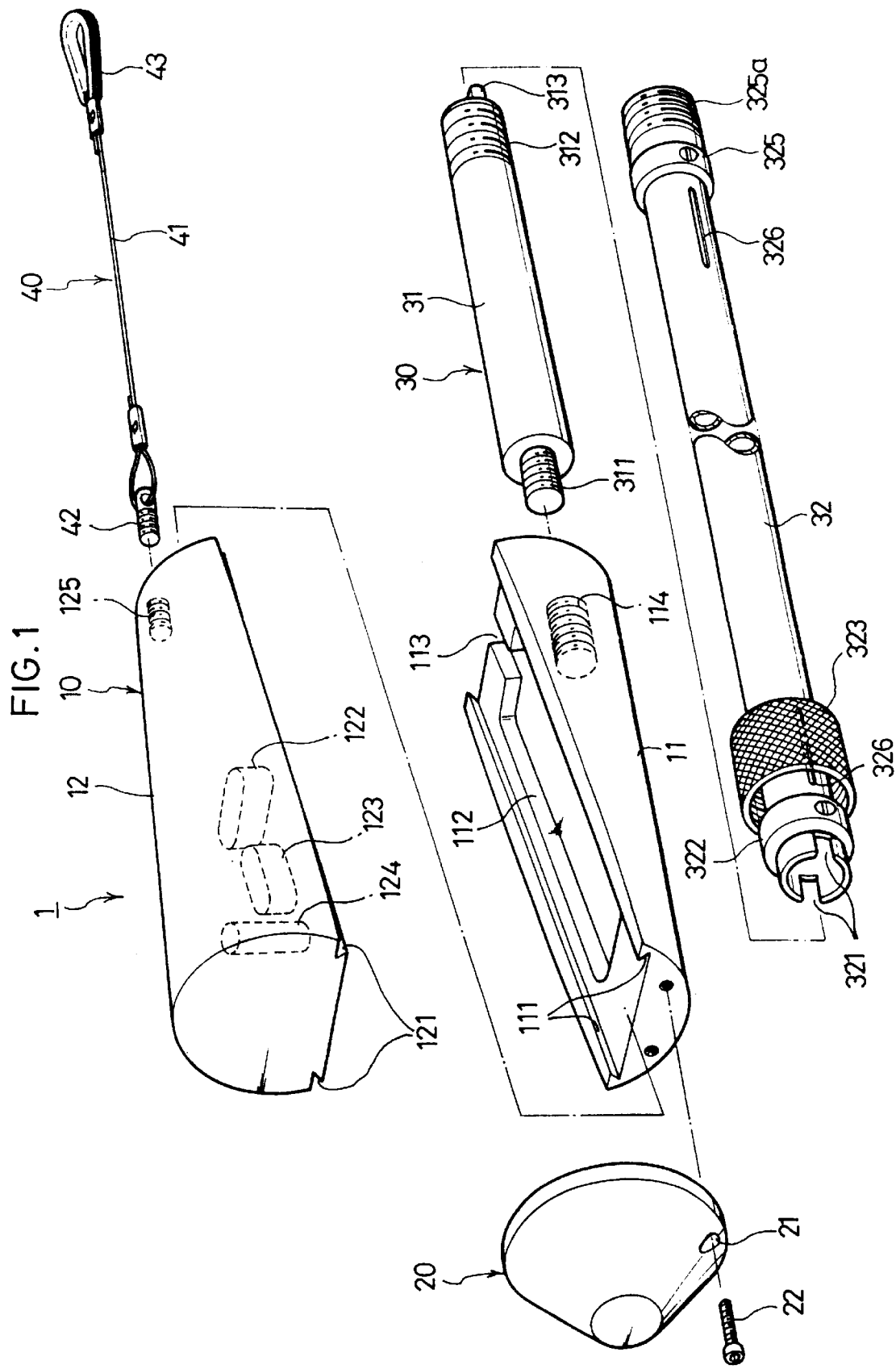
FIG. 1 is an exploded perspective view illustrating an interpenetration apparatus according to the invention.

An interpenetration apparatus comprises a housing 10 divided into a fixture 11 and a mover 12, which are assembled into each other to form a cylinder and receive sensors 2 therein. The fixture 11 and the mover 12 are symmetrically cut in a longitudinal direction with respect to the housing 10 so that the chord length at one end surface of the fixture 11 is approximately equal to that at the other end surface of the mover 12. The fixture 11 includes slant guide grooves 111 longitudinally cut to be stepped at both ends thereof, a passage 113 formed at the end thereof to guide a cable into the housing 10 and a space 112 concaved in the bottom surface of the fixture 11 to receive the cable. The mover 12 includes a slant inserting embossment 121 stepped in a longitudinal direction to couple with the slant guide groove 111; and three receptacles 122, 123 and 124 respectively formed to receive sensors for detecting the blasting vibrations in X, Y and Z directions, respectively, wherein the slant inserting embossment 121 is slidably guided into the slant guide groove 111 continuously connected from a shorter chord length to a larger chord length. Therefore, the slant inserting embossment121 is slided upward along the slant guide groove 111 to enlarge the diameter at the position where the fixture 11 and the mover 12 are coupled to each other.

Figure 2:
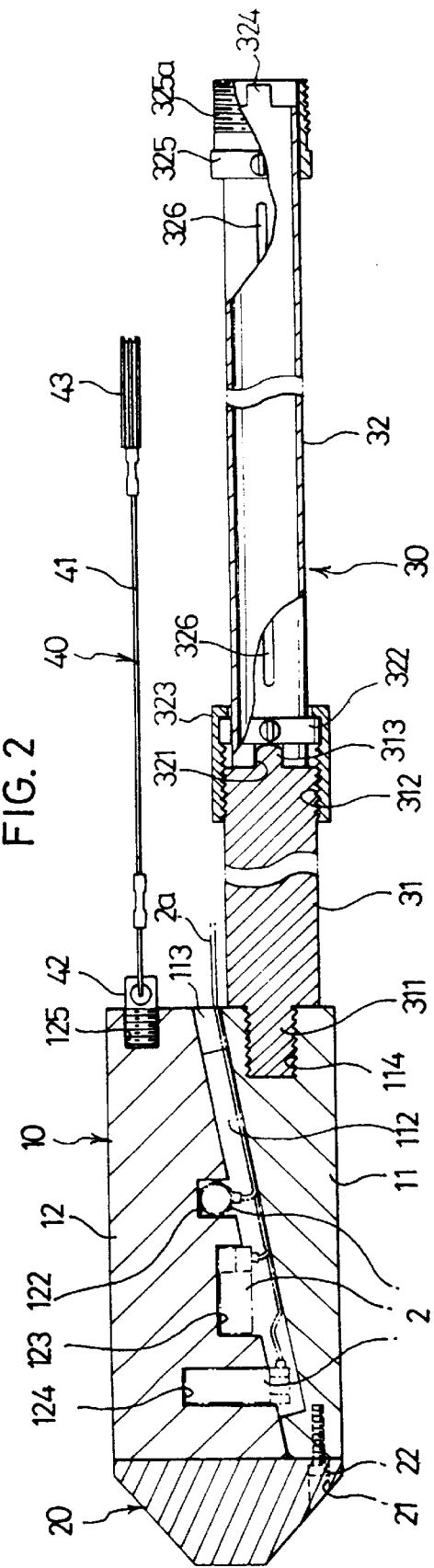
FIG. 2 is a longitudinal view illustrating an interpenetration apparatus according to the invention.
Figure 3:
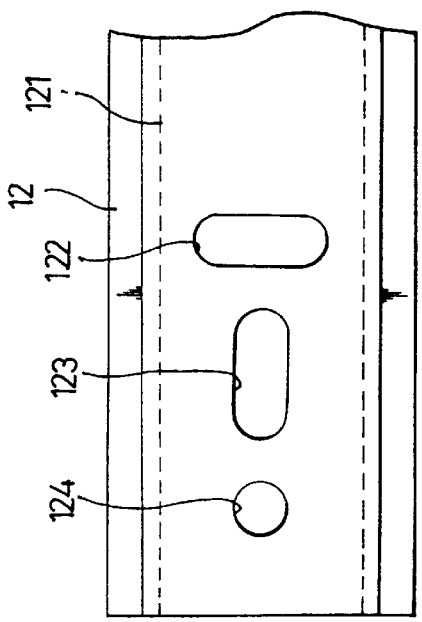
FIG. 3 is a bottom view illustrating a mover of a housing in part according to the invention.
Figure 4A:
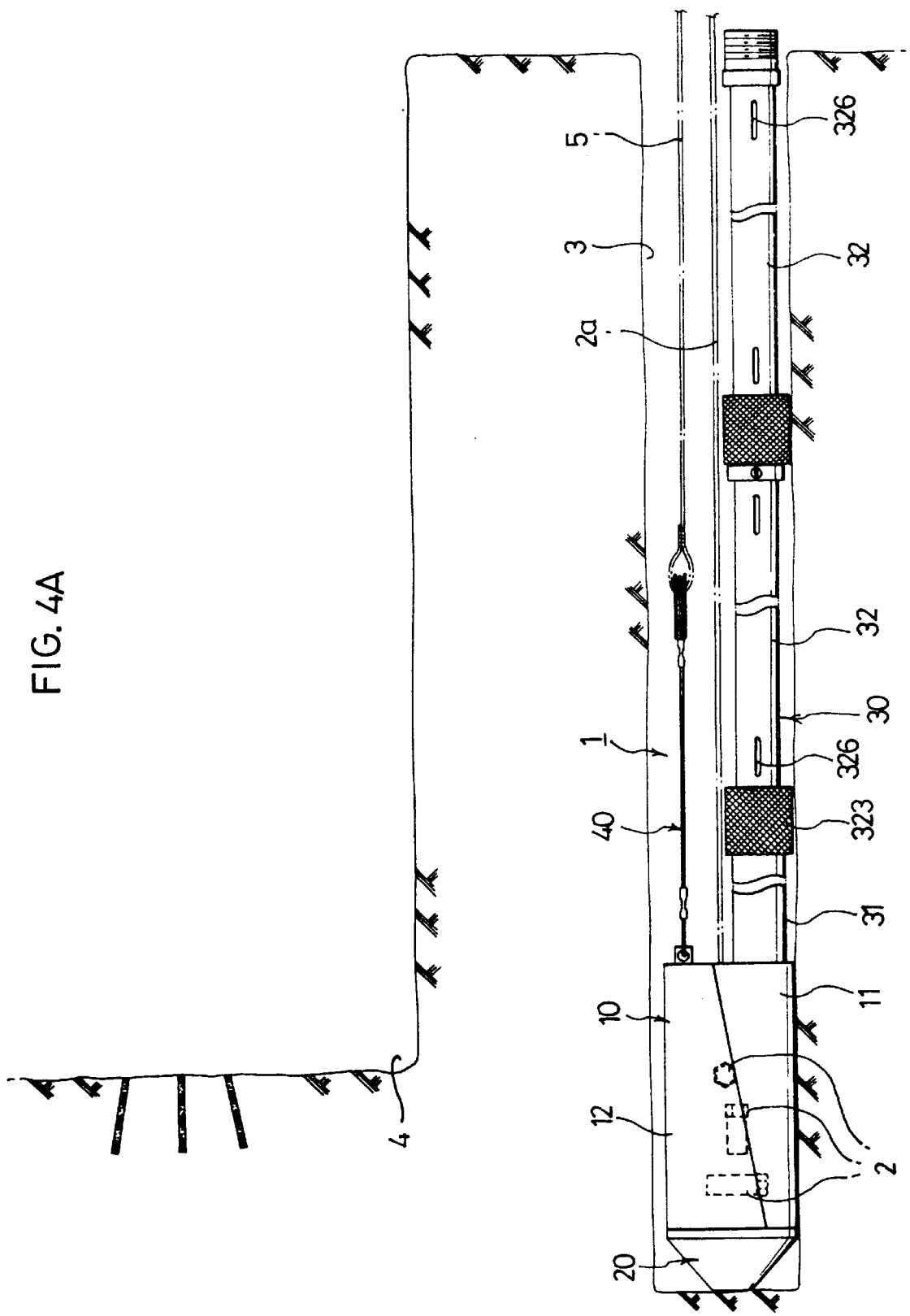
FIGS. 4A and 4B are views illustrating the operating state of an interpenetration apparatus according to the invention.
Figure 4B:
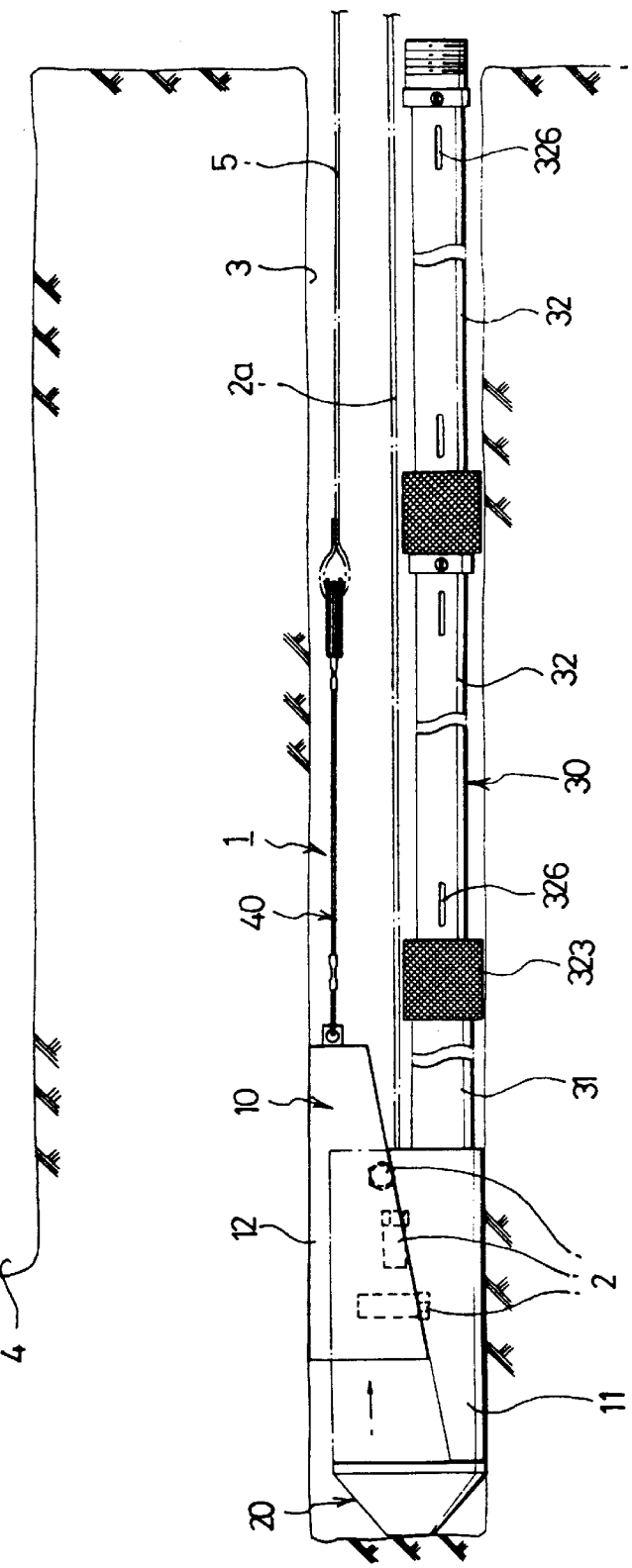

As shown in FIGS. 2, and 3, the housing 10 receives sensors 2 respectively mounted in the receptacles 122, 123 and 124 of the mover 12 and the cable 2a electrically connected to the sensors 2 and wired passing through the space 112 and the passage 113 to a vibrating measurement system outside, in which the sensors 2 each is directed to correspond to the coordinate of X, Y and Z to detect the blasting vibrations transferred to the underground from all directions of the blasting place.

Figure 5:
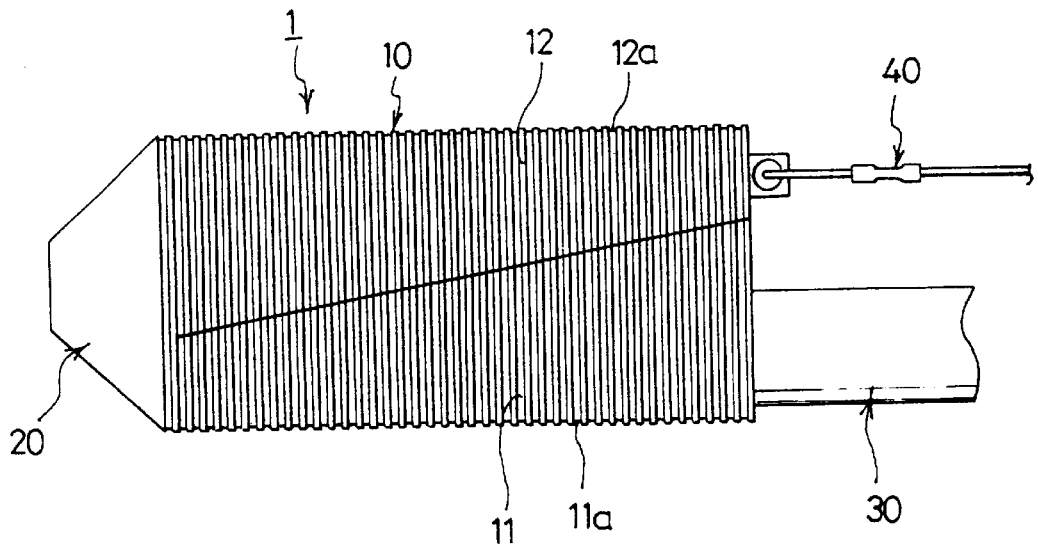
FIG. 5 is a view illustrating an housing of another embodiment according to the invention, in which the housing including a fixture and a mover has a plurality of grooves formed around the peripheral surface thereof.

The fixture 11 and the mover 12 each is provided with threaded hole 114 and 125 to couple with a handle 30 and a traction tool 40. It is preferable that the housing 10 includes a plurality of grooves 11a and 12a repeatedly formed in regular intervals around the periphery thereof with the fixture 11 and the mover 12 being coupled to each other as shown in FIG. 5. It has an advantage in that the grooves 11a and 12a enables the housing 10 to have a larger contacting area to the inner wall of a working hole 3 perforated near the blasting place, so that the housing 10 is kept in a stable position in the working hole 3.

A head 20 is capped on the front portion of the housing 10 to prevent the escape of the mover 12 as well as to easily introduce the housing 10 into the working hole 3. The conical shaped head 20 has a bottom diameter the same as that of the housing 10 to wrap around the front ends of the fixture 11 and the mover 12. The head 20 is coupled by at least one bolt 22 and hole 21 to the fixture 11.

The handle 30 includes a fixing rod 31 threaded to the threaded hole 114 of the fixture 11 and a plurality of connecting rods 32 removably coupled to the fixing rod 31, so that it enables the mover 12 to be coupled with the fixture 11 positioned in the working hole 3 and be separated therefrom. In other words, the handle 30 includes an inserting thread portion 311 at the front end to be fitted into the threaded hole 114, a thread portion 312 formed at the rear end and a rectangular key 313 extended in a predetermined length from the rear surface. The connecting rod 32 includes a key groove 321 formed to receive the rectangular key 313, a fixing ring 322 mounted adjacent to the key groove 321 and a connecting socket 323 having a threaded portion on the inner wall to be coupled onto the thread portion 312. The fixing rod 31 is coupled with the connecting 32 in a manner that the rectangular key 313 is fitted into the key groove 321 and then the thread portion 312 is engaged with the thread portion of the connecting socket 323.

The connecting rod 32 also includes a rectangular key 324 extended from the rear surface, a fixing ring 325 mounted adjacent to the rear end thereof, a thread portion 325a formed to couple with another connecting socket and indicating grooves 326 formed on the predetermined positions of the front and rear wall at the straight line corresponded to the key groove 321 near the fixing rings 322 and 325. Therefore, the connecting 32 can be coupled with another connecting rod having the same configuration thereto by which the rectangular key 324 is fitted into another key groove and the thread portion 325a is engaged with the inner thread portion of another connecting socket. At that time, the indicating grooves 326 enables a user to determine whether the sensors 3 is inserted into the working hole 3 to be positioned toward the blasting position when the housing 10 is inserted into the working hole 3.

A traction tool 40 is connected to the rear end of the mover 12 so that the slant inserting embossment 121 of the mover 12 is slided into the slant guide groove 111 of the fixture 11. In other words, the traction tool 40 includes a wire 41 made of a metal, a thread bolt 42 attached to the front end of the wire 41, a connecting ring fixed to the rear end of the wire 41. The traction tool 40 further includes a rope 5 so that the connecting ring 43 is connected to the rope 5 with the thread bolt 42 engaged into the threaded hole 125 of the mover 12.

Therefore, the housing 10 is inserted into the working hole 3 perforated on the side wall of a tunnel 4 using the handle 30 so that the sensors 2 is directed to the blasting place. Then, the mover 12 is moved backward from the fixture 11 to a place of the working hole 3 using the traction tool 40. In other words, the mover 12 is coupled to the inner wall of the working hole 3 along with the fixture 11 by slidably moving the slant inserting embossment 121 along the inserting guide groove 111. It enables the sensors 2 to exactly detect the blasting vibration transferred at the nearest position in all directions from the blasting place.

Figure 6A:
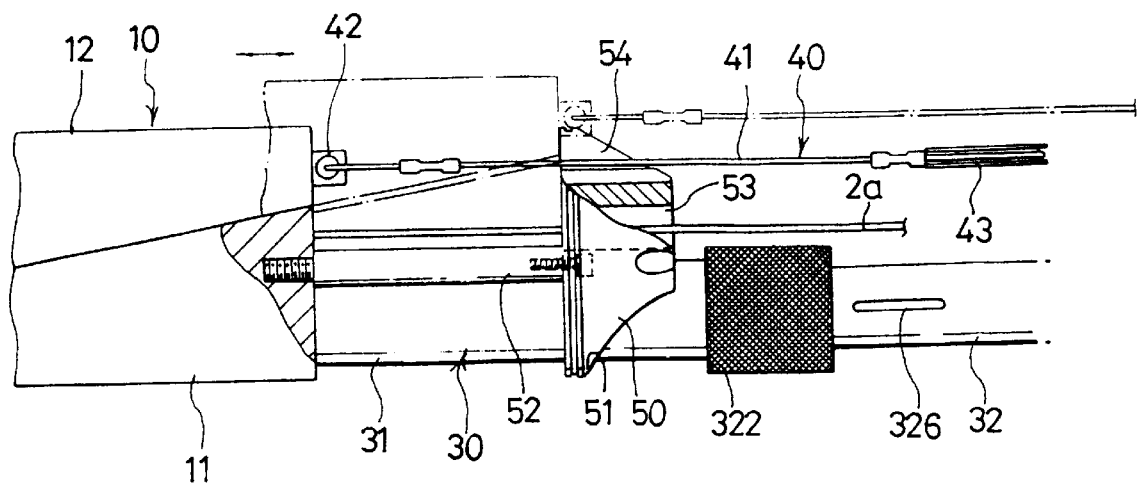
FIG. 6A is a side view illustrating an auxiliary cap coupled to an interpenetration apparatus cut off in part according to the invention; and, FIG. 6B is a perspective view illustrating the auxiliary cap according to the invention.
Figure 6B:
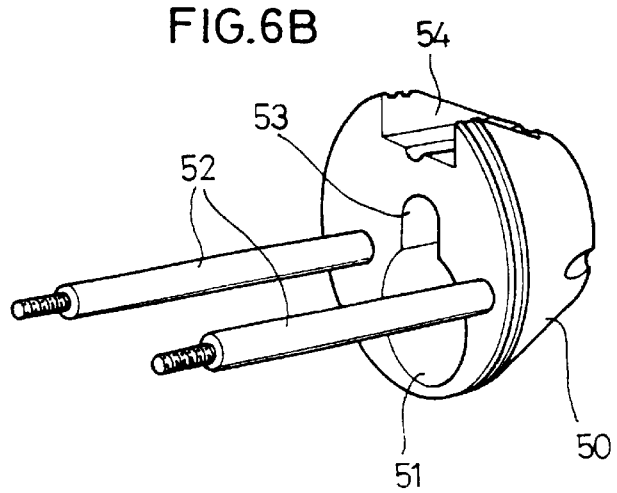

As another embodiment of the invention is shown in FIGS. 6A and 6B, the housing 10 further includes an auxiliary cap 50 having an opening portion 51 formed to pass through the handle 30 and supporters 52 mounted in a predetermined distance from each other on the rear surface of the auxiliary cap 50 to prevent the excessive backward movement of the mover 12 upon the blasting work.

The auxiliary cap 50 preferably includes a cable passage 53 formed adjacent to the opening portion 51 and a wire passage 54 formed on the outer upper portion thereof. Thus, the cable 2a connected to the sensors 2 is wired to pass through the cable passage 53 and the wire 40 connected to the mover 12 is extended through the cable passage 54. In that case, the fixture 11 can not be mounted in the working hole 3 with being separated from the mover 12.

On the other hand, it is noted that above explanation indicates only one interpenetration apparatus 1 is used in the upon the measuring of the blasting vibration, but a plurality of interpenetration apparatuses can be used at once, considering the environment conditions according to the blasting vibration measurement.

Therefore, the invention is assembled and operated as follows:

Before the insertion of a housing 10 into a working hole 3, the housing 10 is first disassembled into a fixture 11 and a mover 12. Sensors 2 are mounted in receptacles 122, 123 and 124, respectively of the mover 12. Cables 2a are wired to a measuring system, passing through a space 112 and a passage 113 of a fixture 11 in turn. Then, the fixture 11 and the mover 12 are coupled with each other to form the housing 10.

Thereafter, a handle 30 and a traction tool 40 having a rope 5 are connected to the housing 10. The housing 10 is inserted into a working hole 3 perforated on the front side of an approach to a tunnel 4, and thus a connecting rod 32 of the handle 30 is adjusted to direct the sensors 2 toward a blasting position. The fixture 11 and the mover 12 are positioned in the working hole 3 by the handle 30, and then the mover 12 is moved backward by the traction tool 40 with being coupled with the fixture 11, so that the coupling portions of the fixture 11 and the mover 12 is fitted to the inner surrounding wall of the working hole 3. Therefore, the interpenetration apparatus 1 is completely assembled in the working hole.

As described above, the invention enables the housing 10 to be at the nearest position from the blasting place, so that the sensors sensitively detect the wave motion of the blasting vibration as well as three dimensional blasting vibration transferred in all directions to the underground, thereby establishing the accuracy measurement of the magnitudes of the blasting vibrations.

As a result, the invention provides an interpenetration apparatus for measuring a magnitude of a blasting vibration at the nearest position from a blasting position, thereby firstly enhancing the precision and reliability on the measurement of the blasting vibration, secondly improving the working environment on the underground blasting vibration measurement and thirdly protecting a sensor from the blasting vibration and impacts as well as prolonging its life.

What is claimed is:

1. An interpenetration apparatus for the measurement of a magnitude of a blasting vibration comprises:

a housing including a fixture and a mover divided into two, symmetrically, in a longitudinal direction, in which the fixture includes a space for receiving a cable and the mover includes at least three grooves perforated to receive sensors, respectively;

a head portion for fixing the front end of the fixture thereto along with the mover to prevent the escape of the mover from the fixture upon the insertion of the housing into a working hole;

a handle including a fixing rod threadedly coupled to the rear portion of the fixture and a connecting rod connected to the fixing rod and extended in a predetermined length therefrom to insert the interpenetration apparatus into the working hole perforated adjacent to an approach to a tunnel; and, a traction means connected to the rear end of the mover to operate the mover.

2. The interpenetration apparatus for the measurement of a magnitude of a blasting vibration as claimed in claim 1, in which:

the housing comprises the fixture and the mover divided into two, symmetrically, in which the fixture includes slant guide grooves longitudinally cut to be stepped at both ends thereof, a passage formed at the end thereof to guide a cable into the housing and a space concaved in the bottom surface of the fixture to receive the cable, and the mover includes a slant inserting embossment stepped in a longitudinal direction to couple wit the slant guide grooves; and three receptacles respectively formed to receive the sensors for detecting the blasting vibrations in X, Y and Z directions, wherein the slant inserting embossment is slidably guided into the slant guide grooves continuously connected from a shorter chord length to a larger chord length.

3. The interpenetration apparatus for the measurement of a magnitude of a blasting vibration as claimed in claim 1, in which:

the housing includes a plurality of grooves repeatedly formed in regular intervals around the periphery thereof with the fixture and the mover being coupled to each other.

4. The interpenetration apparatus for the measurement of a magnitude of a blasting vibration as claimed in claim 1, in which:

the traction means includes a wire made of a metal, a thread bolt attached to the front end of the wire and a connecting ring fixed to the rear end of the wire.

5. The interpenetration apparatus for the measurement of a magnitude of a blasting vibration as claimed in claim 1, in which:

the housing further includes an auxiliary cap having an opening portion formed to pass through the handle and supporters mounted in a predetermined distance from each other on the rear surface of the auxiliary cap.

6. The interpenetration apparatus for the measurement of a magnitude of a blasting vibration as claimed in claim 5, in which:

the auxiliary cap further includes a cable passage formed adjacent to the opening portion and a wire passage formed on the outer upper portion thereof.

7. The interpenetration apparatus for the measurement of a magnitude of a blasting vibration as claimed in claim 1, in which:

the handle includes an inserting thread portion at the front end to be fitted into a threaded hole of the fixture, a thread portion formed at the rear end and a rectangular key extended in a predetermined length from the rear surface, and the connecting rod includes a key groove formed to receive the rectangular key, a fixing ring mounted adjacent to the key groove and a connecting socket having a threaded portion on the inner wall to be coupled onto the thread portion.

8. The interpenetration apparatus for the measurement of a magnitude of a blasting vibration as claimed in claim 1, in which:

the connecting rod includes a key groove formed to receive a rectangular key, a rectangular key extended from the rear surface, a fixing ring mounted adjacent to the rear end thereof, a thread portion formed to couple to with another connecting socket and indicating grooves formed on predetermined positions along the front and rear wall of the connecting rod in a straight line corresponding to the key groove near the fixing ring, which enables the housing to be at the nearest position from a blasting place, so that the sensors sensitively detect the wave motion of the blasting vibration as well as three dimensional blasting vibration transferred in all directions to the underground, thereby establishing the accuracy measurement of the magnitudes of the blasting vibrations.

* * * * *